United States Patent
Polen

(10) Patent No.: US 10,518,402 B1
(45) Date of Patent: Dec. 31, 2019

(54) UTENSIL SET

(71) Applicant: Michael K. Polen, Tampa, FL (US)

(72) Inventor: Michael K. Polen, Tampa, FL (US)

(*) Notice: Subject to any disclaimer, the term of this patent is extended or adjusted under 35 U.S.C. 154(b) by 0 days.

(21) Appl. No.: 15/002,323

(22) Filed: Jan. 20, 2016

Related U.S. Application Data

(60) Provisional application No. 62/119,734, filed on Feb. 23, 2015.

(51) Int. Cl.
- *B25F 1/02* (2006.01)
- *A47J 43/28* (2006.01)
- *B25G 1/04* (2006.01)
- *B67B 7/16* (2006.01)

(52) U.S. Cl.
CPC ............ *B25F 1/02* (2013.01); *A47J 43/288* (2013.01); *B25G 1/04* (2013.01); *B67B 7/16* (2013.01)

(58) Field of Classification Search
CPC .. A47J 43/288; B25F 1/02; B25F 1/04; B25G 1/04
USPC .............. 7/110, 112, 113, 151, 167; D7/649; 30/147
See application file for complete search history.

(56) References Cited

U.S. PATENT DOCUMENTS

| | | | | |
|---|---|---|---|---|
| 116,412 A | * | 6/1871 | Chapman | B26B 3/00 30/298.4 |
| 356,452 A | * | 1/1887 | Cox | B26B 3/00 30/298.4 |
| 588,174 A | * | 8/1897 | Praunegger | B26B 11/00 30/143 |
| D28,925 S | * | 6/1898 | Peck | 30/353 |
| 812,424 A | * | 2/1906 | Hellmuth | |
| 825,976 A | * | 7/1906 | Neiglick | B26B 5/001 30/162 |
| 1,446,114 A | * | 2/1923 | Boyd | A47J 19/022 7/113 |
| 1,776,443 A | * | 9/1930 | Martin | B25F 1/02 15/111 |

(Continued)

OTHER PUBLICATIONS

"Amazon.com: Compac Mayo Knife & Jar Scraper Spreader—Plastic Knife Spatula for Scraping Mayonnaise Jars and Spreading Condiments: Health & Personal Care", downloaded from www.amazon.com/Compac-Mayo-Knife-Scraper-Spreader/dp/B001DVYEQQ?th=1 on Feb. 18, 2019.

*Primary Examiner* — Tyrone V Hall, Jr.
(74) *Attorney, Agent, or Firm* — Chad Peterson

(57) ABSTRACT

An extendable kitchen utensil operable to utilize a plurality of extendable and interchangeable culinary operational members. A culinary operational member includes a shank and an operational end constructed to perform culinary tasks. The extendable kitchen utensil includes a handle having a longitudinal channel and slot. The shank is configured to slidably traverse within the channel. A positioning member secured to the shank travels within the longitudinal slot in the handle to provide control of shank positioning. The handle and shank have formed connectors that mateably engage to provide defined securable positions for the shank. A support member that may also function as a bottle opener is connected to the handle and functions as a prop to improve sanitation. One specific embodiment of a culinary operational member is configured to mateably engage with one or more portions of internal wall sections of a conventional food jar to improve food removal.

95 Claims, 5 Drawing Sheets

(56) References Cited

U.S. PATENT DOCUMENTS

| | | | | |
|---|---|---|---|---|
| 1,926,944 A * | 9/1933 | Hester | B26B 3/00 | 15/236.01 |
| 2,225,658 A * | 12/1940 | Rauchfuss | A47J 43/25 | 241/37.5 |
| 2,559,689 A * | 7/1951 | Truesdell | B26B 3/06 | 30/123 |
| 2,873,522 A * | 2/1959 | Homola | A47G 21/023 | 30/129 |
| 2,904,373 A * | 9/1959 | Dowdy | B25G 1/00 | 30/342 |
| 3,220,110 A * | 11/1965 | Popeil | A47J 17/02 | 30/143 |
| 3,977,289 A * | 8/1976 | Tuke | A61B 17/14 | 30/392 |
| 4,114,216 A * | 9/1978 | Gatby | B26B 23/00 | 7/116 |
| 4,389,777 A * | 6/1983 | Landsberger | A47G 21/08 | 30/324 |
| 4,586,256 A * | 5/1986 | Weimann | B26B 5/001 | 30/162 |
| 4,630,373 A * | 12/1986 | Staurseth | B23D 51/02 | 30/162 |
| 4,823,419 A * | 4/1989 | Stimpson | B25F 1/00 | 294/2 |
| 4,884,307 A * | 12/1989 | Flood | B25F 1/04 | 30/162 |
| 5,497,553 A * | 3/1996 | Chong | B26B 5/002 | 30/162 |
| 5,584,123 A * | 12/1996 | Chi | B23D 51/01 | 30/125 |
| 5,590,472 A * | 1/1997 | Yaakov | A47G 21/02 | 30/298.4 |
| 5,774,994 A * | 7/1998 | Stein | A47J 37/0786 | 294/7 |
| 6,006,433 A * | 12/1999 | Baltazar | B26B 5/001 | 30/152 |
| 6,055,733 A * | 5/2000 | Chen | A47G 21/10 | 16/429 |
| 6,789,326 B1 * | 9/2004 | Huang | B23D 51/01 | 30/162 |
| D527,602 S * | 9/2006 | Axon | D8/95 | |
| 7,516,550 B2 * | 4/2009 | Hagan | B23D 51/01 | 30/162 |
| 8,272,132 B2 * | 9/2012 | Bolgert | A47J 45/10 | 30/298.4 |
| 8,746,765 B1 * | 6/2014 | Mafi | A47J 43/288 | 294/7 |
| D758,823 S * | 6/2016 | Hawkins | D8/105 | |
| 2004/0255388 A1 * | 12/2004 | Lion | F16L 5/02 | 7/113 |
| 2005/0138736 A1 * | 6/2005 | Tarlow | A47G 21/06 | 7/110 |
| 2007/0084063 A1 * | 4/2007 | Hughes | A47G 21/02 | 30/298.4 |
| 2010/0263219 A1 * | 10/2010 | Kempker | B25F 1/02 | 30/337 |
| 2011/0239376 A1 * | 10/2011 | Schmidt | A45B 3/00 | 7/167 |
| 2014/0138280 A1 * | 5/2014 | Meinzer | B25F 1/02 | 206/577 |
| 2015/0272362 A1 * | 10/2015 | Lisek | A47J 43/288 | 294/7 |

* cited by examiner

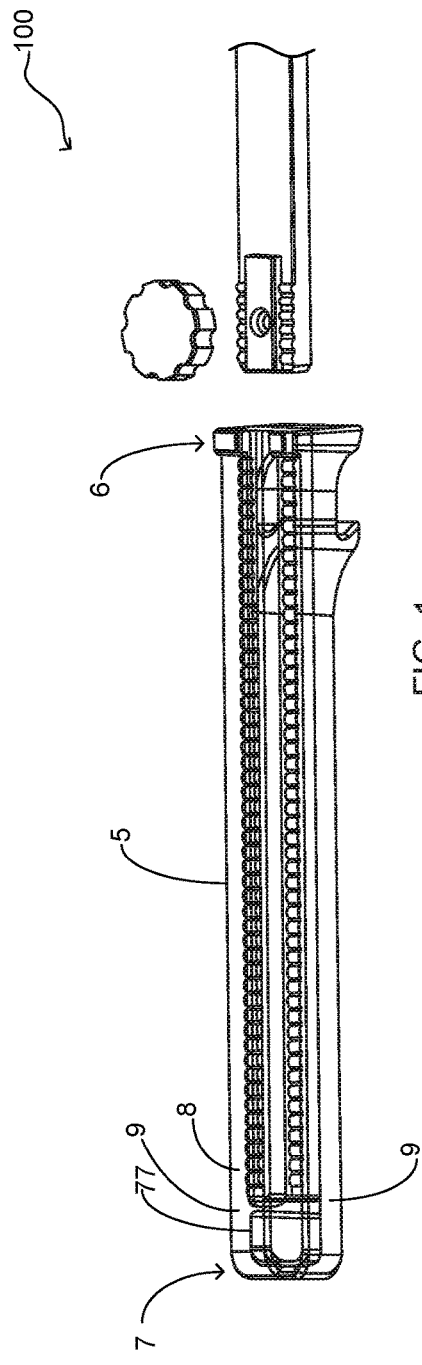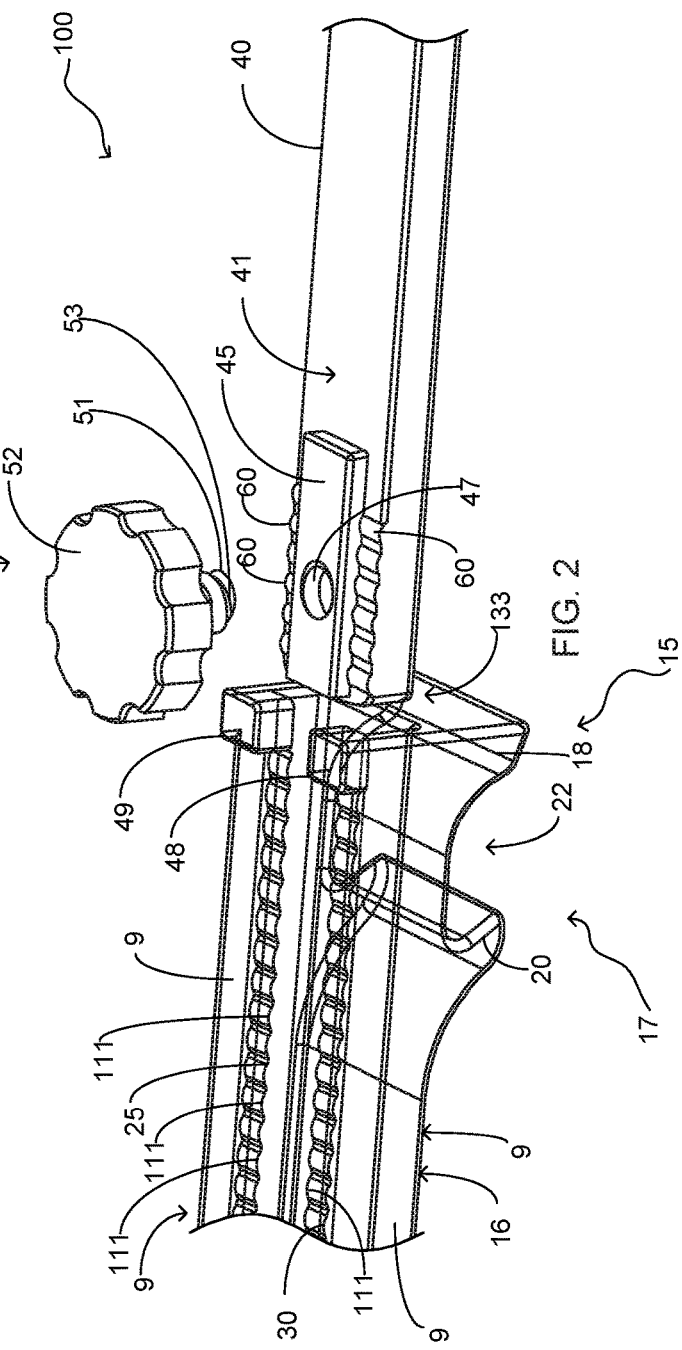

UTENSIL SET

PRIORITY UNDER 35 U.S.C Section 119(e) & 37 C.F.R. Section 1.78

This nonprovisional application claims priority based upon the following prior United States Provisional Patent Application entitled: Utensil Set, Application No.: 62/119,734 filed Feb. 23, 2015, in the name of Michael K. Polen, which is hereby incorporated by reference for all purposes.

FIELD OF THE INVENTION

The present invention relates generally to kitchen utensils, more specifically but not by way of limitation, a kitchen utensil set that includes a handle operable to receive a plurality of extendable and interchangeable culinary operational members designed to perform specific culinary tasks.

BACKGROUND

Eating, preparation, and serving utensils are numerous and commonly specialized. From conventional forks to specialized spatulas, these kitchen tools have evolved over the years to provide improved and specific functionality. By way of example but not limitation, numerous types of spatulas are available that are designed to accommodate various food products and cooking scenarios.

Some common kitchen utensils include but are not limited to knives, forks, spatulas, mixing apparatuses such as but not limited to whisks and various scoops operable to retrieve food items. The aforementioned kitchen utensils are provided in various embodiments and are operable to perform the specific task set for which they were created. Some problems with the existing kitchen utensil market is the need to purchase and store the substantially same kitchen utensil in different lengths, to store kitchen utensils of considerable length, and to store standalone kitchen utensil bodies/assemblies. This results in over-crowded kitchen drawers and can present an organizational challenge.

Another issue with conventional kitchen utensils such as the models discussed above is the lack of unique and improved design elements operable to improve functionality over existing technology in the field such as providing extended reach capability, improving scooping efficiency of food material within in a jar and a means to improve sanitation. Additionally, existing technology does not provide a convenient means to interchange the culinary operational portions of the aforementioned kitchen utensils with a common handle.

Accordingly, there is a need for a kitchen utensil set with such improvements that includes a handle wherein the handle is operable to receive therein a plurality of interchangeable and length-adjustable culinary operational members constructed to perform specific culinary tasks.

SUMMARY OF THE INVENTION

It is the object of the present invention to provide a kitchen utensil set that includes a handle operable to receive a plurality of interchangeable and extendable culinary operational members wherein each culinary operational member is constructed to execute specific culinary tasks.

Another object of the present invention is to provide a kitchen utensil set that includes a handle wherein the handle has a channel formed therewith that extends substantially the length of the handle such that the handle has an interior volume and an end opening providing access thereto.

Yet a further object of the present invention is to provide a kitchen utensil set that includes a handle having a channel wherein an outside surface of the handle includes a slot providing access to the channel.

An additional object of the present invention is to provide a kitchen utensil set having a handle with a channel wherein the culinary operational members include a shank that is formed to mateably insert into the channel of the handle and further include an operational end connected at the distal end of the shank that is constructed to execute specific culinary tasks.

Another object of the present invention is to provide a kitchen utensil set having a handle with a channel wherein the shank of the culinary operational members is slidably moveable within the channel of the handle and is further configured to be length-adjusted and potentially secured utilizing a positioning member such as but not limited to a threaded bolt that is coupled with the shank. It is further provided that a portion of the positioning member is operable to travel within the slot to facilitate user positioning of the shank within the handle.

A further object of the present invention is to provide a kitchen utensil set having a handle operable to receive extendable culinary operational members wherein the culinary operational members include connectors formed on the shank that mately engage with connectors formed within the handle to establish a plurality of defined positions for the shank within the handle.

An additional object of the present invention is to provide a kitchen utensil set having a handle wherein the handle further includes a stop member, the stop member being formed with the handle and is operable to prevent the shank of the culinary operational member from sliding outside of the handle unintentionally.

Still another object of the present invention is to provide a kitchen utensil set having a handle operable to receive plurality of interchangeable culinary operational members wherein the handle includes a support member to provide a stable resting position that ensures the shank and operational end of the culinary operational member is elevated above the countertop or other such resting surface to improve sanitation. It is further contemplated that the support member may include a bottle opener operable to facilitate the removal of a conventional bottle cap.

A further object of the present invention is to provide a kitchen utensil set having a handle with a support member wherein the handle includes a weight member to inhibit the culinary operational member, especially in an extended position, from tipping downward toward a resting surface.

An additional object of the present invention is to provide a kitchen utensil set having a culinary operational member embodiment with an operational end configured to be utilized as a knife wherein the operational end includes elements such as but not limited to an edge with multiple edge segments mateably shaped with one or more portions of various internal wall sections of a conventional food jar, another edge with a serrated portion for cutting and a point element that is operable to pierce, cut and/or open foil or similar materials disposed across an opening of a container or used as packaging and a broad surface area for efficient scooping and/or spreading.

Yet another object of the present invention is to provide a kitchen utensil set having a handle operable to slidably couple with a plurality of interchangeable culinary operational members wherein in additional embodiments of a culinary operational member, the operational end is configured to perform the function of kitchen utensils such as but not limited to a spatula, fork, skewer, knife, stirring apparatus, scoop, spoon, ladle, turner, basting brush, strainer, whisk, skimmer and/or server.

An additional object of the present invention is to provide an alternate embodiment of the culinary operational member wherein the culinary operational member is constructed so as to utilize a common shank with the distal end of the common shank configured to releasably receive a plurality of interchangeable operational ends constructed to perform the function of kitchen utensils such as but not limited to those aforementioned.

To the accomplishment of the above and/or related objects the present invention may be embodied in the form illustrated in the accompanying drawings. Attention is called to the fact that the drawings are illustrative only. Variations are contemplated as being a part of the present invention, limited only by the scope of the present invention.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a detailed view of the handle of the present invention showing the internal elements thereof; and FIG. 2 is a detailed view of a portion of the handle and a portion of the shank of the present invention showing the internal elements of the handle.

DETAILED DESCRIPTION

Figure 3:
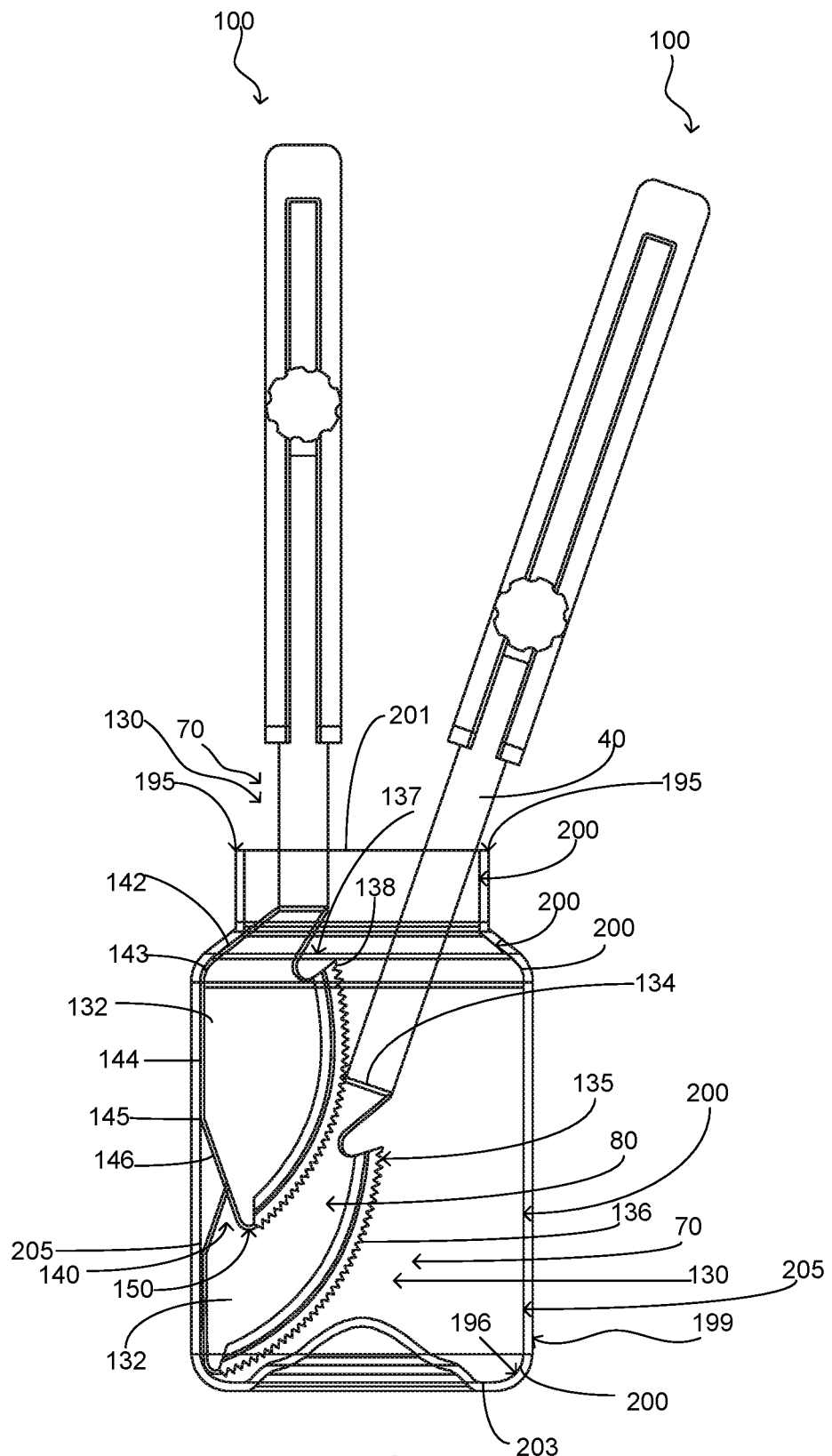
FIG. 3 is a cross-sectional view of an exemplary jar wherein the same embodiment of the present invention is illustrated in two positions relative thereto.

Referring now to the drawings submitted herewith, wherein various elements depicted therein are not necessarily drawn to scale and wherein through the views and figures like elements are referenced with identical reference numerals, there is illustrated a kitchen utensil 100 constructed according to the principles of the present invention.

Figure 4:
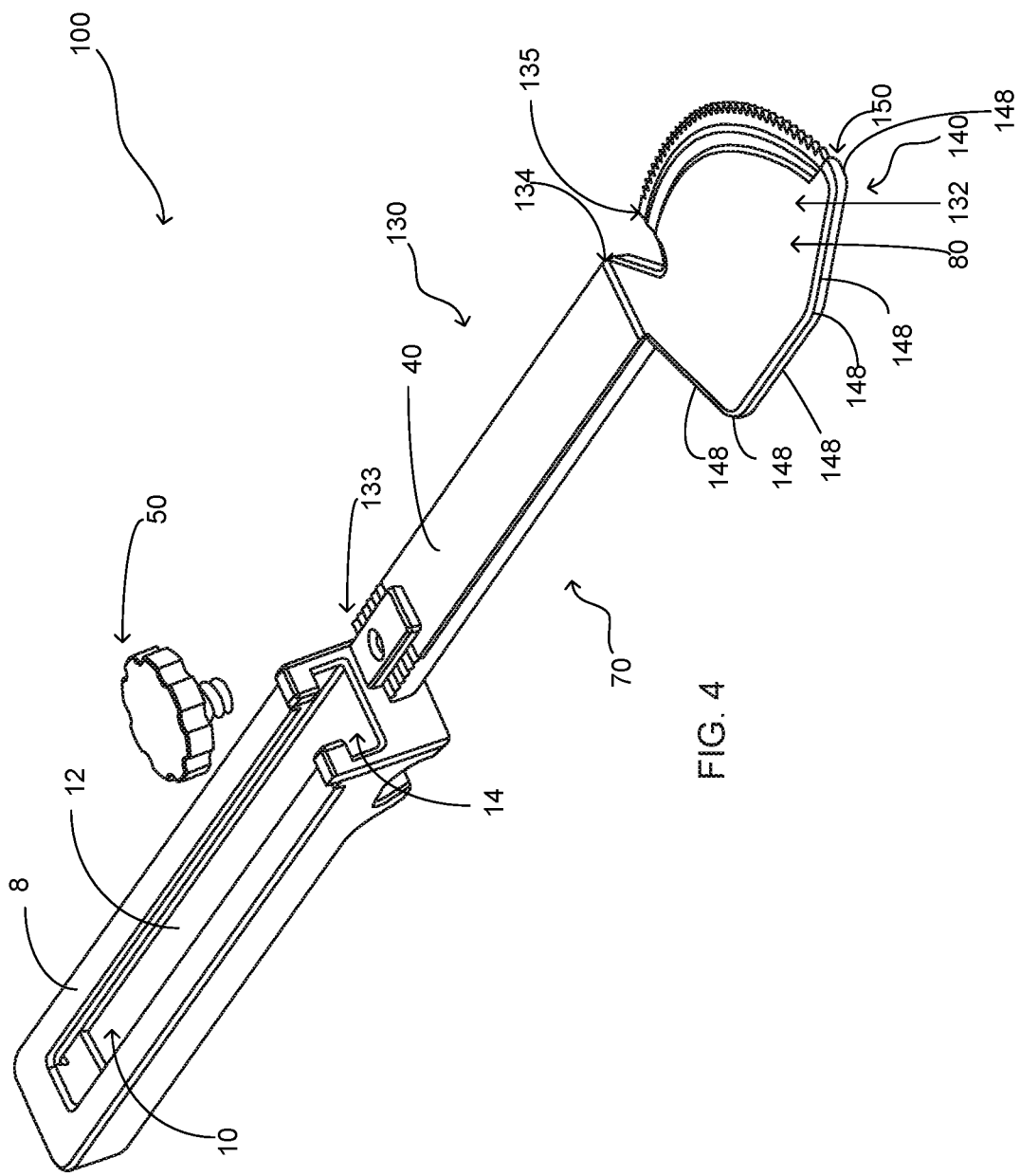
FIG. 4 is a perspective disassembled view of the present invention.

Referring in particular to FIGS. 1, 2 and 4 herein the kitchen utensil 100 includes a handle 5 being generally rectangular in shape having a first end 6 and second end 7. Handle 5 is manufactured from a suitable durable material such as but not limited to plastic and/or metal. Handle 5 includes a plurality of outside surfaces 9 which includes an upper surface 8 and a lower surface 16. Upper surface 8 of handle 5 includes a slot 10 longitudinally formed therein that provides an opening to channel 12. Slot 10 extends substantially intermediate first end 6 and second end 7 and provides a technique to allow knob 52 of positioning member 50 to traverse along the upper surface 8 of handle 5 as further discussed herein. Channel 12 is formed longitudinally within the handle 5 and extends substantially the length of handle 5 and creates an end opening 14 in handle 5 proximate first end 6. End opening 14 is formed in a shape so as to accommodate shank 40 of the culinary operational member 70 and allow shank 40 to be inserted therein. Culinary operational member 70 includes a shank 40 and an operational end 80 wherein operational end 80 is constructed to execute specific culinary tasks. Operational end 80 is integrally formed with shank 40 proximate second end 134 of shank 40. Channel 12 is configured such that channel 12 is incapable of receiving a substantial portion of operational end 80 therein. While operational end 80 has been illustrated herein as being integrally formed with shank 40, it is contemplated within the scope of the present invention that operational end 80 could be releasably connected to shank 40 proximate second end 134 and achieve the desired functionality described herein. It is also contemplated within the scope of the present invention that handle 5 along with any affected elements could be formed in various alternate shapes, sizes and configurations and achieve the desired functionality described herein. It is further contemplated within the scope of the present invention that any shape of handle 5, such as but not limited to a rounded shape, is considered to include a plurality of outside surfaces 9 defined by region, such an upper region/surface, lower region/surface and side regions/surfaces.

The lower surface 16 of handle 5 includes a support member 15 that is integrally formed thereon proximate first end 6. Support member 15 includes a bottle opener 17 formed therewith. Bottle opener 17 includes a first protrusion 18 and a second protrusion 20 extending downward from the lower surface 16 and further include a void 22 therebetween. Void 22 is of suitable size so as to accommodate a conventional bottle cap therein. First protrusion 18 and second protrusion 20 are formed so as to provide a technique to pry off a conventional bottle cap such as but not limited to a soda or beer bottle cap. Those skilled in the art will recognized that first protrusion 18 and second protrusion 20 are formed similarly to a conventional bottle cap remover. Support member 15 further provides a means and technique to elevate first end 6 of handle 5 and creates an elevated and rising trajectory for operational end 80 when kitchen utensil 100 is resting on a generally flat surface, such as but not limited to a kitchen countertop. By keeping the culinary operational member 70 above a resting surface on which the kitchen utensil 100 has been superposed, culinary operational member 70 can avoid being contaminated by bacteria or similar substances on the resting surface and the resting surface can be kept free of food substance existing on the culinary operational member 70. While the illustrated support member 15 with bottle opener 17 herein represents a specific implementation of a support member 15, it is contemplated within the scope of the present invention that the support member 15 could be implemented in a variety of alternate shapes, locations and configurations and could be releasably connected to handle 5 and achieve the desired functionality described herein. It is additionally contemplated within the scope of the present invention that the bottle opener 17 could be constructed to perform a variety of functions related to conventional bottles and conventional food cans such as, but not limited to, twist removal of bottle caps from conventional bottles and/or piercing of the top or bottom surface of conventional food cans.

A weight member 77 is disposed within the handle 5 proximate the second end 7 utilizing suitable durable techniques. The weight member 77 is manufactured from a material such as but not limited to metal and is operable to bias the second end 7 of the handle 5 against a surface on which the kitchen utensil 100 has been superposed so as to maintain the culinary operational member 70 in an elevated position so as to not contact the surface on which the kitchen utensil 100 has been superposed regardless of the selected position of culinary operational member 70 relative to handle 5. While a specific embedded implementation of weight member 77 has been illustrated herein, it is contemplated within the scope of the present invention that weight member 77 could be implemented in a variety of forms, shapes and configurations and connect to handle 5 in alternate manners and locations and achieve the desired functionality described herein.

Shown in particular in FIG. 2 herein, the handle 5 further includes a first row of connectors 25 and a second row of connectors 30. The first row of connectors 25 and the second row of connectors 30 are disposed within the channel 12 on opposing sides of the slot 10 and include a plurality of concave sections 111. The first row of connectors 25 and the second row of connectors 30 extend the substantial length of the channel 12 and are operable to mateably engage the projections 60 formed on the upper surface 41 of shank 40. The first row of connectors 25 and second row of connectors 30 are inwardly arcuate in shape so as to provide a mateable connection with the convex shaped projections 60 that are formed on opposing sides of the upper surface 41 of shank 40 proximate first end 133 of shank 40. Projections 60 are mateably coupled with the first row of connectors 25 and second row of connectors 30 so as to provide a plurality of defined incrementally lockable positions of the shank 40 within the channel 12. While a specific shape and configuration has been illustrated herein for the first row of connectors 25, second row of connectors 30 and projections 60, it is contemplated within the scope of the present invention that a variety of connectors could be formed or attached to handle 5 and shank 40 and implemented using alternate mateable shapes, quantities, elements, and configurations and achieve the desired functionality described herein. It is additionally contemplated within the scope of the present invention that slot 10 could be formed in any one or more of the outside surfaces 9 of handle 5 whereby affected elements such as but not limited to incremental positioning connectors (such as first row of connectors 25, second row of connectors 30 and projections 60), positioning member 50 and stop members 48,49 would be configured to accommodate such alternate slot 10 configurations and achieve the desired functionality described herein.

A mounting portion 45 is centrally formed on the upper surface 41 proximate the first end 133 of the shank 40 and is raised in elevation so as to protrude upwards into the slot 10 subsequent the shank 40 being inserted into the channel 12. The raised elevation and the shape of the mounting portion 45 is such that it assists in maintaining an orientation of the shank 40 as it traverses through the channel 12 so as to substantially inhibit any lateral movement thereof and also provides for additional engagement depth with shaft 51 of positioning member 50 and adds strength to the shank 40 when extended. Perpendicularly bored into the mounting portion 45 is the hole 47, which is formed utilizing suitable techniques and is threaded so as to receive the shaft 51 of the positioning member 50. Positioning member 50 includes the knob 52 having integrally formed shaft 51 wherein the shaft 51 has the threads 53 that are operable to mateable engage with the threads formed in the hole 47. Positioning member 50 is manufactured from a suitable durable material such as but not limited to plastic or metal. It is contemplated within the scope of the present invention that the implementation of the mounting portion 45 is optional and may not be included in some embodiments. Knob 52 is constructed to facilitate ergonomic engagement with a user's fingers so as to facilitate rotation and movement thereof. By way of example but not limitation, the knob 52 may be constructed in a knurled fashion to provide ergonomic engagement.

Knob 52 is rotatable in a first direction and a second direction when engaged with hole 47. In its first direction, the knob 52 is rotated so as to move away from the shank 40 and handle 5. By rotating the knob 52 in its first direction, the knob 52 can be moved marginally away from the handle 5 in order to move positioning member 50 to a slidable position that will allow the shank 40 to be slidably traversed within the channel 12. As shank 40 slidably traverses channel 12, a portion of the positioning member 50 correspondingly slides within slot 10. While in its slidable position, the positioning member 50 is operable to control the traversing of shank 40 within the channel 12. Ensuing the shank 40 being moved to the desired position within handle 5, the knob 52 is rotated in its second direction wherein the knob 52 is moved towards the shank 40 and handle 5 until it reaches a locked position. In this locked position, the positioning member 50 further biases the shank 40 upwards to facilitate the projections 60 engagement with the first row of connectors 25 and second row of connectors 30 in order to lock the position of the shank 40 relative to the handle 5. While the positioning member 50 having knob 52 and shaft 51 with threads 53 along with the mounting portion 45 having threaded hole 47 have been illustrated herein, it is contemplated within the scope of the present invention that the mechanisms to control and secure the shank 40 position within the handle 5 could be constructed in alternate manners and configurations with various elements and achieve the desired functionality herein. By way of example, but not limitation, positioning member 50 could be one or more formed or connected protrusions on shank 40 operable to slidably move within slot 10 such that knob 52 (along with threads 53) would be optional and the securement of the shank 40 position within handle 5 would be managed by one or more separate elements that would provide a bias on shank 40 within handle 5 such that projections 60 (or equivalent connector) lock into first row of connectors 25 and second row of connectors 30 (or equivalent connector) until positioning member 50 is used to apply an opposing force to the shank 40 bias within handle 5 to unlock shank 40 and enable shank 40 positioning within the handle 5.

The handle 5 includes stop members 48,49 mounted on opposing sides of the slot 10 proximate first end 6. The stop members 48,49 are integrally formed with the upper surface 8 of handle 5 and extend upward therefrom. The stop members 48,49 are operable to inhibit the positioning member 50 from traversing therepast during adjustment of the shank 40 position when the positioning member 50 is in its slidable position. Shank 40 of the culinary operational member 70 is however readily removable from within the handle 5 to enable convenient cleaning and interchangeability of one culinary operational member 70 with another. To remove the shank 40 from within the handle 5, the knob 52 is moved away from the shank 40 and handle 5 to the extent that the knob 52 of the positioning member 50 is either elevated above the stop members 48,49 or the positioning member 50 is completely removed from the mounting portion 45 of the shank 40. Those skilled in the art will recognize that the stop members 48,49 could be attached to the handle 5 in a variety of manners and formed in various sizes, shapes and configurations and it is further contemplated within the scope of the current invention that only one stop member 48,49 need be present. It is additionally contemplated within the scope of the present invention that various shapes, sizes, quantities and configurations of shank 40, mounting portion 45, positioning member 50, channel 12 and/or slot 10 could be implemented whereby affected elements would be accommodatingly configured and achieve the desired functionality described herein.

Referring in particular to FIG. 3, the knife operational member 130 is a specific embodiment of the culinary operational member 70 and illustrated therein. The knife operational member 130 includes an operational knife end 132 with a broad surface that is generally planar in manner so as to function well when scooping or spreading a food item from an exemplary jar 199. Culinary operational member 70, including the knife operational member 130, is manufactured from suitable durable materials such as but not limited to plastic and/or stainless steel. The operational knife end 132 is secured with shank 40 proximate the second end 134 of shank 40. The illustrated operational knife end 132 includes two longitudinal edges, lower edge 135 and upper edge 140, and an end edge 150 that connects lower edge 135 with upper edge 140. A longitudinal edge, such as lower edge 135 and upper edge 140, includes all edge portions on its respective side of the operational knife end 132. An end edge, such as end edge 150, includes all edge portions intermediate the longitudinal edges (such as lower edge 135 and upper edge 140) it connects. The illustrated operational knife end 132 includes a lower edge 135 having a serrated portion 136 wherein the serrated portion 136 is arcuate in shape. The lower edge 135 further includes a notch 137 and point element 138 that is formed thereon. Notch 137 is operable to provide functional access to point element 138 wherein point element 138 is constructed to pierce, cut and open foil or similar materials disposed across an opening of a container or used as packaging. It is contemplated within the scope of the present invention that the operational knife end 132 could include one or more longitudinal edges, such as lower edge 135 and upper edge 140, and zero or more end edges, such as end edge 150.

Still referring in particular to FIG. 3, the operational knife end 132 of the knife operational member 130 includes an upper edge 140 opposite the lower edge 135. The upper edge 140 includes a first edge segment 142, second edge segment 143, third edge segment 144, fourth edge segment 145 and fifth edge segment 146 so as to mateably engage with one or more portions of various internal wall sections 200 of a wall member 195 of an exemplary jar 199. An edge segment (such as first edge segment 142, second edge segment 143, third edge segment 144, fourth edge segment 145 and fifth edge segment 146) is a portion of an edge (such as lower edge 135, upper edge 140 and end edge 150) that is angular or different in contour with respect to an adjoining edge portion of the same edge and if an edge has only one constant shape (such as illustrated end edge 150), the edge itself is also considered an edge segment. An exemplary jar 199 includes two wall members 195. Wall members 195 represent opposing sides of the wall structure of an exemplary jar 199 from a cross-sectional view as illustrated in FIG. 3. Wall members 195 extend from the top rim 201 to the bottom internal surface 203 of an exemplary jar 199. Each wall member 195 includes a plurality of adjoining internal wall sections 200. An internal wall section 200 is a portion of a wall member 195 that is angular or different in contour with respect to an adjoining portion of the same wall member 195 of an exemplary jar 199 from a cross-sectional view as illustrated in FIG. 3 wherein any perimeter grooves (facing inward or outward), inconsequential variations or threads formed in an exemplary jar 199 are exceptions and treated as non-existent.

Referring in particular to FIG. 3 and FIG. 4, the edge segment surfaces 148 (shown in FIG. 4) of the first edge segment 142, second edge segment 143, third edge segment 144, fourth edge segment 145, fifth edge segment 146, and end edge 150 are smooth in form so as to improve the mating to and scooping from internal wall sections 200. The first edge segment 142, third edge segment 144 and fifth edge segment 146 are substantially straight in manner and therefore substantially angular with respect to each other. The third edge segment 144 is offset from shank 40 so as to improve the lateral reach of operational knife end 132 such that the third edge segment 144 can mateably engage a portion of a main internal wall section 205 of an exemplary jar 199. A main internal wall section 205 is an internal wall section 200 that extends the greatest distance longitudinally (with respect to an exemplary jar 199) from a cross-sectional view as illustrated in FIG. 3 wherein any perimeter grooves or inconsequential variations formed in an exemplary jar 199 are treated as non-existent. As it relates to operational knife end 132 and the elements thereof mating to exemplary jars 199, a mateably engaged portion (as conveyed by phrases such as but not limited to "mateably engage with a portion") is a portion of an internal wall section 200 with substantive length (not a point) relative to either the corresponding edge segment (such as first edge segment 142, second edge segment 143, third edge segment 144, fourth edge segment 145, fifth edge segment 146 or end edge 150) or the corresponding internal wall section 200 involved in the mating.

By way of example but not limitation (as shown in FIG. 3), in one scenario, when the kitchen utensil 100 is held in a position such that the kitchen utensil 100 is in a generally vertical position, the first edge segment 142, second edge segment 143 and third edge segment 144 are each operable to mateably engage a portion of an internal wall section 200 of an exemplary jar 199. In this position, the upper edge 140 can engage and remove material from three different internal wall sections 200 simultaneously. It is contemplated within the scope of the present invention that the operational knife end 132 could be constructed to mateably engage with various portions of a variety of internal wall sections 200 of one or more exemplary jars 199 either simultaneously or otherwise. By way of example, but not limitation, different edges (such as lower edge 135, upper edge 140 and end edge 150) could be configured to mateably engage with different portions of various internal wall sections 200 of one or more exemplary jars 199. It is further contemplated within the scope of the present invention that the longitudinal edges (such as lower edge 135 and upper edge 140) could be configured in various offset or staggered configurations.

As shown in FIG. 3, in an alternate positioning of the kitchen utensil 100 the fifth edge segment 146 of the upper edge 140 will mateably engage with a portion of a main internal wall section 205 and the end edge 150 will mateably engage with a portion of the internal bottom corner 196 wherein the internal bottom corner 196 is also an internal wall section 200. In the context of having operational knife end 132 and various elements thereof (including but not limited to edges and edge segments) being mated or mateably engaged with various internal wall sections 200 (including main internal wall sections 205) or one or more portions thereof, a close approximation of mating or alignment is conveyed as exemplary jars 199 sometimes include perimeter grooves (facing inward or outward) or inconsequential variations that are not accommodated and treated as non-existent in this context. Those skilled in the art will recognize that the operational knife end 132 and the edges thereof (such as lower edge 135, upper edge 140 and end edge 150) could be formed in a variety of different shapes, sizes, contours, and configurations so as to accommodate and mateably engage with one or more portions of various internal wall sections 200 of different sizes and shapes of exemplary jars 199 and/or to improve food removal therefrom. By way of example, but not limitation, lower edge 135, upper edge 140 and end edge 150 could contain a variety of edge segments shaped in a variety of shapes and configurations. Also, by way of example, but not limitation, end edge 150 may be optional or exist as a point.

Figure 6:
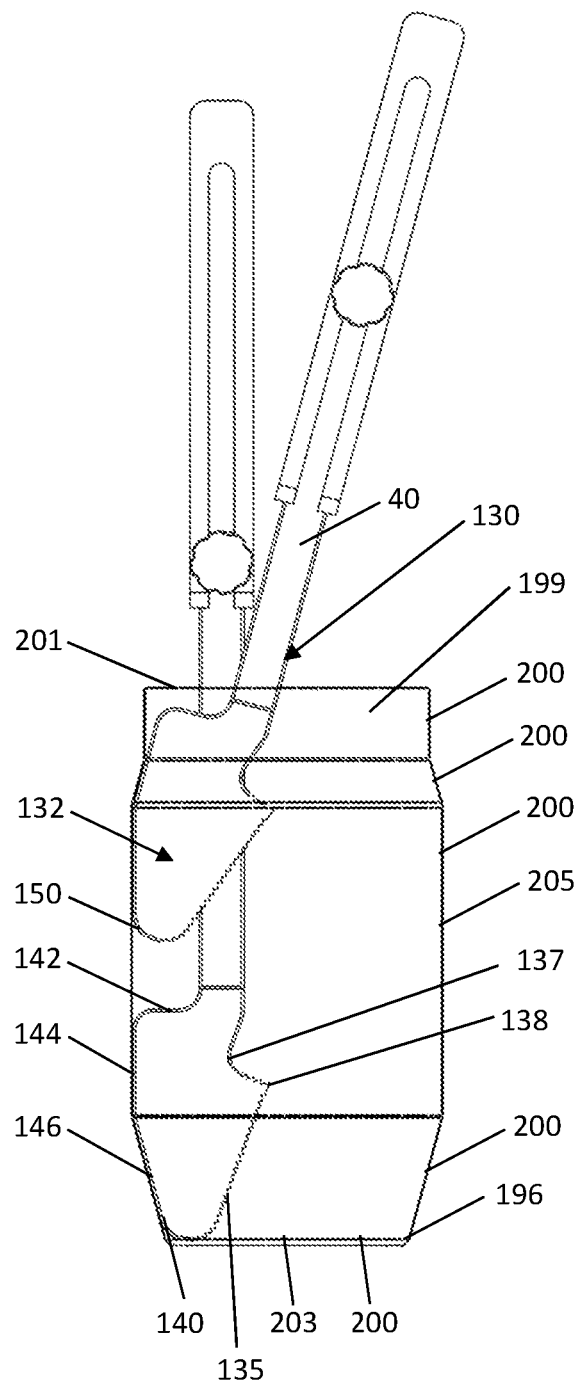
FIG. 6 is a cross-sectional view of an alternative exemplary jar wherein an embodiment of the present invention is illustrated in two positions relative thereto.

Illustrated in FIG. 6 is an alternative embodiment of the kitchen utensil 100 with an operational knife end 132. In this embodiment, the operational knife end 132 has an upper longitudinal edge 140 with an alternative arrangement of edge segments to fit an alternate jar 199. As can be seen in FIG. 6, the operational knife end 132 also includes an end edge 150 sized to mateably engage with one or more portions of a bottom internal surface 203 of the jar 199. The operational knife end 132 may also include a cutting edge between point element 138 and notch 137. The cutting edge, which may be serrated, may be used to cut foil or similar materials disposed across an opening of a container or used as packaging. The lower longitudinal edge 135 of the operational knife end illustrated in FIG. 6 include a non-arcuate serrated portion.

Figure 5:
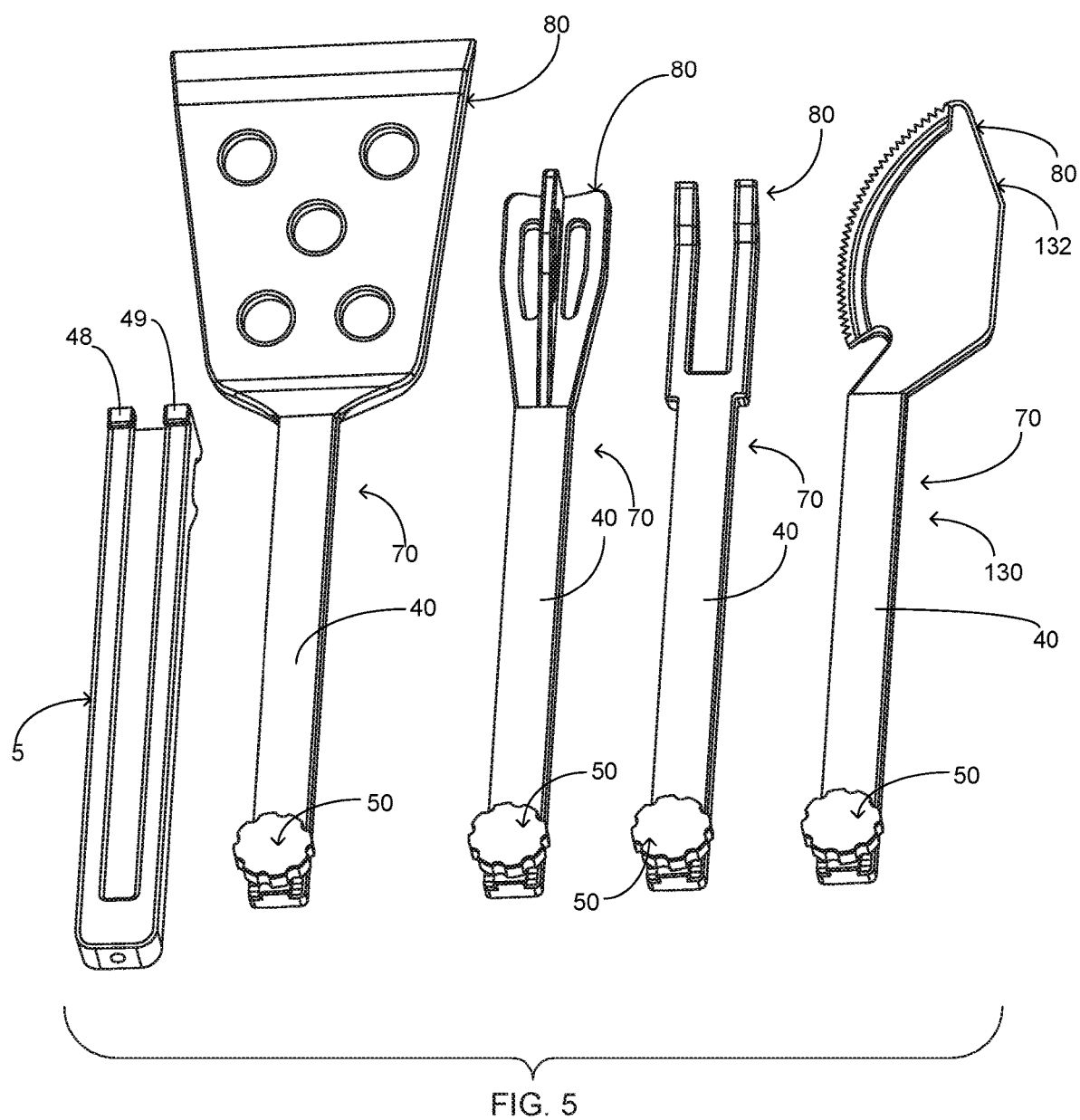
FIG. 5 is a group of exemplary embodiments of the culinary operational member and an exemplary embodiment of the handle of the present invention.

Illustrated herein in FIG. 5 are some specific embodiments of the culinary operational member 70. While various culinary operational members 70 are illustrated therein, it is contemplated within the scope of the present invention that the kitchen utensil 100 could be manufactured with culinary operational members 70 having a wide variety of different operational ends 80. By way of example, but not limitation, operational end 80 could be a spatula, fork, skewer, knife, stirring apparatus, scoop, spoon, ladle, turner, basting brush, strainer, whisk, skimmer and/or server.

It is contemplated within the scope of the present invention that an alternate embodiment of the culinary operational member 70 would include the second end 134 of the shank 40 being configured with a fastener (not illustrated herein) operable to couple with a fastener (not illustrated herein) secured to the operational end 80 wherein different operational ends 80 are interchangeably mounted on the second end 134 of the shank 40 when desired. Those skilled in the art will recognize that a variety of different types of fasteners could be utilized to interchangeably connect the operational ends 80 with the second end 134 of the shank 40.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An extendable kitchen utensil comprising:
   a handle having a first end and a second end, said handle including a plurality of outside surfaces, said handle including a channel formed longitudinally therein and a slot coextensive with at least a portion of the length of the channel, said slot extending from said channel through at least one of said plurality of outside surfaces of said handle; and
   an operational member, said operational member including a shank and an operational end, said operational end being connected to said shank proximate an end of said shank, said shank being configured to be slidably coupled with said channel of said handle, said channel being configured to receive a substantial portion of said shank therein, said operational end being configured for food related tasks;
   wherein said operational member is operable to be manipulated to and used in various lengths relative to said handle;
   wherein said handle further includes at least two first connectors, said first connectors each comprising a projection formed internally on a top surface of said channel or a cavity formed internally in said surface; and
   wherein said shank includes at least one second connector with an arcuate surface, at least one of said first connectors being configured to securely engage with at least one of said at least one second connector so as to provide defined incremental and lockable positioning of said shank within said handle.

2. The extendable kitchen utensil as recited in claim 1, wherein said extendable kitchen utensil further includes a positioning member, said positioning member being connected with said shank, said positioning member moving with said shank, said positioning member being configured such that a portion of said positioning member is operable to be slidably moveable within said slot, said positioning member being operable to facilitate positioning of said shank relative to said handle.

3. The extendable kitchen utensil as recited in claim 2, wherein said positioning member is configured to facilitate controlled resistance and locking of said first and second connectors.

4. The extendable kitchen utensil as recited in claim 2, wherein said positioning member is securely connected directly to said shank.

5. The extendable kitchen utensil as recited in claim 2, wherein said positioning member and said shank include mateable threads so as to control movable coupling therebetween.

6. The extendable kitchen utensil as recited in claim 2, wherein said shank is configured to provide an upward bias to a portion of the shank within said handle, wherein said shank is movable within said channel when said positioning member is pressed down and wherein said first and second connectors securely engage one another when said positioning member receives no downward pressure, securing the position of said shank relative to said handle.

7. The extendable kitchen utensil as recited in claim 1, wherein said first and second connectors enable incremental positioning of said shank relative to said handle so as to provide more than four defined lockable positions.

8. The extendable kitchen utensil as recited in claim 1, wherein said operational end is configured to be releasably connected to said shank.

9. The extendable kitchen utensil as recited in claim 1, wherein said handle includes at least one stop member proximate said first end of said handle and extending outward therefrom, said slot extending through said first end of said handle, said at least one stop member being operable to prevent said shank from travelling outside of said handle.

10. The extendable kitchen utensil as recited in claim 1, wherein said handle includes a support member proximate said first end of said handle, said support member being configured to elevate said operational end and to facilitate support of said operational end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, said first protrusion extending downward from said handle a greater distance than any other of said plurality of protrusions, wherein at least said first and second protrusions are configured to jointly remove a conventional bottle cap.

11. The extendable kitchen utensil as recited in claim 1, wherein said operational end includes a longitudinal scraping edge with a plurality of edge segments, each of said plurality of edge segments has a defined length, at least two of said edge segments of said longitudinal scraping edge other than a longest edge segment have a length between 50% and 99% of the length of the longest edge segment, and said longitudinal scraping edge is operable to simultaneously mateably engage with at least two of a plurality of internal wall sections and an internal bottom corner of a conventional food jar.

12. The extendable kitchen utensil as recited in claim 11, wherein said operational end is further configured to simultaneously mateably engage a bottom internal surface of said conventional food jar along with said at least two of said plurality of internal wall sections and said internal bottom corner of said conventional food jar.

13. The extendable kitchen utensil as recited in claim 11, wherein said operational end includes a longitudinal cutting edge on a side opposite said longitudinal scraping edge, and said longitudinal cutting edge includes a portion that is serrated so as to be operable to cut a food object.

14. A kitchen utensil comprising:
a knife operational member, said knife operational member including a shank and an operational knife end, said shank having a first end and a second end, said operational knife end being connected to said shank proximate said second end of said shank, said operational knife end including a longitudinal scraping edge, an end edge, and a longitudinal cutting edge, said longitudinal scraping edge including a first substantially straight edge segment, a second substantially straight edge segment and a third substantially straight edge segment, said first substantially straight edge segment being proximate to said shank and at an angle to said shank, said second substantially straight edge segment being proximate to said first substantially straight edge segment and at an angle to said first substantially straight edge segment, said third substantially straight edge segment being proximate to said second substantially straight edge segment, and wherein the angle between the second and third substantially straight edge segments is substantially more than ninety degrees;
wherein said third substantially straight edge segment is configured to mateably engage with a linear internal wall section of a conventional food jar adjacent to an internal bottom corner of said conventional food jar when said kitchen utensil is disposed within said jar and oriented more longitudinally than latitudinally relative to said jar;
wherein the average distance between said end edge and said first end of said shank is greater than the average distance between any other edge or edge segment of said operational knife end and said first end of said shank.

15. The kitchen utensil as recited in claim 14, wherein each of said substantially straight edge segments of said longitudinal scraping edge has a defined length, and said length of said first and third substantially straight edge segments of said longitudinal scraping edge is between 50% and 150% of said length of said second substantially straight edge segment of said longitudinal scraping edge.

16. The kitchen utensil as recited in claim 15, wherein said operational knife end has a maximum width as measured perpendicular to a longitudinal centerline of said operational knife end, said shank has a maximum width as measured perpendicular to a longitudinal centerline of said shank, said maximum width of said operational knife end is at least 2.5 times greater than said maximum width of said shank, said shank has a maximum length, said operational knife end has a maximum length, and said maximum length of said shank is at least 1.5 times greater than said maximum length of said operational knife end.

17. The kitchen utensil as recited in claim 15, wherein said end edge has a maximum length as measured perpendicular to a longitudinal centerline of said operational knife end, said operational knife end has a maximum width at approximately a longitudinal midpoint of said operational knife end as measured perpendicular to said longitudinal centerline of said operational knife end, said maximum length of said end edge is less than 50% of said maximum midpoint width of said operational knife end, said end edge includes at least one substantially straight edge segment, and said end edge is configured to simultaneously mateably engage said internal bottom corner of said jar while said longitudinal scraping edge mateably engages said wall section adjacent said bottom corner of said jar.

18. The kitchen utensil as recited in claim 14, wherein said longitudinal cutting edge includes a portion that is serrated so as to be operable to cut a food object.

19. The kitchen utensil as recited in claim 14, wherein said longitudinal cutting edge includes a portion that is arcuate in shape.

20. The kitchen utensil as recited in claim 14, wherein said knife operational member includes:
a point element, said point element including a tip; said point element positioned on or near a lateral side of said knife operational member; and
a notch, said notch adjacent said point element and said shank, said notch comprising two sides that are at an angle to each other of less than 60 degrees, at least one of said sides of said notch being configured for cutting;
wherein said notch is of sufficient width and depth to rest on a top rim of said conventional food jar and to enable said tip of said point element to pierce through material disposed across an opening of said conventional food jar and to enable the cutting of said material as said notch is moved against said material, wherein said notch is not part of a serrated edge segment.

21. The kitchen utensil as recited in claim 14, wherein said second substantially straight edge segment is parallel or nearly parallel to said shank so as to mateably engage with a portion of a main internal wall section of said conventional food jar.

22. The kitchen utensil as recited in claim 14, wherein said operational knife end is configured to simultaneously mateably engage with said internal bottom corner and at least two of a plurality of internal wall sections of said conventional food jar.

23. The kitchen utensil as recited in claim 22, wherein said operational knife end is further configured to simultaneously mateably engage a bottom internal surface of said conventional food jar along with said at least two of said plurality of internal wall sections and said internal bottom corner of said conventional food jar.

24. The kitchen utensil as recited in claim 14, further comprising a handle having a first end and a second end, said shank being configured to be slidably coupled with said handle wherein said operational knife end is operable to be manipulated to and used in various lengths relative to said handle.

25. The kitchen utensil as recited in claim 24, wherein said handle includes a plurality of outside surfaces, said handle including a channel formed longitudinally therein, said channel including a slot formed longitudinally therewith, said slot extending from said channel through at least one of said plurality of outside surfaces of said handle, said shank being configured to be slidably coupled with said channel of said handle, said channel being configured to receive a substantial portion of said shank therein.

26. The kitchen utensil as recited in claim 25, wherein said handle further includes at least two first connectors, said first connectors each comprising a projection formed on a surface of said channel or a cavity formed in said surface, said shank including at least one second connector, at least one of said first connectors being configured to securely engage with at least one of said at least one second connector so as to provide defined incremental and lockable positioning of said shank within said handle.

27. The kitchen utensil as recited in claim 25, wherein said kitchen utensil further comprises a positioning member, said positioning member being connected to said shank, said positioning member moving with said shank, said positioning member being configured such that a portion of said positioning member is operable to be slidably moveable within said slot, said positioning member being operable to facilitate positioning of said shank relative to said handle;
wherein either said positioning member is connected directly to said shank with mateable threads, or said positioning member is formed with said shank and said shank has an upward bias within said handle.

28. The kitchen utensil as recited in claim 25, wherein said handle includes at least one stop member proximate said first end of said handle and extending outward therefrom, said slot extending through said first end of said handle, said at least one stop member being operable to prevent said shank from travelling outside of said handle.

29. The kitchen utensil as recited in claim 24, wherein said handle includes a support member proximate said first end of said handle, said support member being configured to elevate said operational knife end and to facilitate support of said operational knife end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, said first protrusion extending downward from said handle a greater distance than any other of said plurality of protrusions, wherein at least said first and second protrusions are configured to jointly remove a conventional bottle cap.

30. The kitchen utensil as recited in claim 14, wherein said operational knife end is configured to be releasably connected to said shank.

31. An extendable kitchen utensil comprising:
a handle having a first end and a second end, said handle including a plurality of outside surfaces, said handle including a channel formed longitudinally therein and a slot coextensive with at least a portion of the length of the channel, said slot extending from said channel through at least one of said plurality of outside surfaces of said handle;
an operational member, said operational member including a shank and an operational end, said operational end being connected to said shank proximate an end of said shank, said shank being configured to be slidably and longitudinally coupled with said channel of said handle, said channel being configured to receive a substantial portion of said shank therein, said operational end being configured for food related tasks; and
a positioning member, said positioning member being securely connected directly to said shank, said positioning member moving with said shank, said positioning member being configured such that a portion of said positioning member is operable to be slidably moveable within said slot, said positioning member being operable to facilitate positioning of said shank relative to said handle;
wherein said positioning member includes an integral connector, said shank includes an integral connector, and said connector of said positioning member and said connector of said shank include threads mateable with each other so as to control movable coupling therebetween; and
wherein said positioning member is operable to cause a variable upward force on said shank, wherein said variable upward force causes said shank to move toward an upper surface of said channel.

32. The extendable kitchen utensil as recited in claim 31, wherein said shank includes a mounting portion, said mounting portion extending outward from said shank, said mounting portion being slidably moveable within said slot, said mounting portion operable to receive said positioning member.

33. The extendable kitchen utensil as recited in claim 31, wherein said operational end is configured to be releasably connected to said shank.

34. The extendable kitchen utensil as recited in claim 31, wherein said handle further includes at least two first connectors, said first connectors each comprising a projection formed on a surface of said channel or a cavity formed in said surface, said shank including at least one second connector, at least one of said first connectors being configured to securely engage with at least one of said at least one second connector so as to provide defined incremental and lockable positioning of said shank within said handle.

35. The extendable kitchen utensil as recited in claim 31, wherein said handle includes at least one stop member proximate said first end of said handle and extending outward therefrom, said slot extending through said first end of said handle, said at least one stop member being operable to prevent said shank from travelling outside of said handle.

36. The extendable kitchen utensil as recited in claim 31, wherein said handle includes a support member proximate said first end of said handle, said support member being configured to elevate said operational end and to facilitate support of said operational end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, said first protrusion extending downward from said handle a greater distance than any other of said plurality of protrusions, wherein at least said first and second protrusions are configured to jointly remove a conventional bottle cap.

37. The extendable kitchen utensil as recited in claim 31, wherein said operational end includes a longitudinal scraping edge with a plurality of edge segments, each of said plurality of edge segments has a defined length, at least two of said edge segments of said longitudinal scraping edge other than a longest edge segment have a length between 50% and 99% of the length of the longest edge segment, and said longitudinal scraping edge is operable to simultaneously mateably engage with at least two of a plurality of internal wall sections and an internal bottom corner of a conventional food jar.

38. The extendable kitchen utensil as recited in claim 37, wherein said operational end is further configured to simultaneously mateably engage a bottom internal surface of said conventional food jar along with said at least two of said plurality of internal wall sections and said internal bottom corner of said conventional food jar.

39. The extendable kitchen utensil as recited in claim 37, wherein said operational end includes a longitudinal cutting edge on a side opposite said longitudinal scraping edge, and said longitudinal cutting edge includes a portion that is serrated so as to be operable to cut a food object.

40. An extendable kitchen utensil comprising:
a handle having a first end and a second end, said handle including a plurality of outside surfaces, said handle including a channel formed longitudinally therein and a slot coextensive with at least a portion of the length of the channel, said slot extending from said channel through at least one of said plurality of outside surfaces of said handle;
an operational member, said operational member including a shank and an operational end, said shank having a first end and a second end, said operational end being connected to said shank proximate said second end of said shank, said shank being configured to be slidably coupled with said channel of said handle, said channel being configured to receive a substantial portion of said shank therein, said operational end being configured for food related tasks; and
a positioning member, said positioning member being connected with said shank, said positioning member moving with said shank, said positioning member being configured such that a portion of said positioning member is operable to be slidably moveable within said slot, said positioning member being operable to facilitate positioning of said shank relative to said handle, said slot extending through at least said first end of said handle so as to allow said positioning member and said shank to travel outside of said handle;
wherein said handle further includes at least one stop member connected to said handle in a fixed location proximate said first end of said handle and extending outward therefrom, said at least one stop member being operable to inhibit said positioning member of said shank from moving therepast as said shank is slidably traversed within said channel.

41. The extendable kitchen utensil as recited in claim 40, wherein said positioning member is securely connected directly to said shank.

42. The extendable kitchen utensil as recited in claim 40, wherein said positioning member and said shank include mateable threads so as to control movable coupling therebetween.

43. The extendable kitchen utensil as recited in claim 40, wherein said positioning member includes a knob, said knob being operable to move away from said shank so as to allow said positioning member to travel past said at least one stop member, facilitating removal of said shank from said handle.

44. The extendable kitchen utensil as recited in claim 40, wherein said operational end is configured to be releasably connected to said shank.

45. The extendable kitchen utensil as recited in claim 40, wherein said shank is configured to provide an upward bias to a portion of the shank within said handle.

46. The extendable kitchen utensil as recited in claim 40, wherein said handle further includes at least two first connectors, said first connectors each comprising a projection formed on a surface of said channel or a cavity formed in said surface, said shank including at least one second connector, at least one of said first connectors being configured to securely engage with at least one of said at least one second connector so as to provide defined incremental and lockable positioning of said shank within said handle.

47. The extendable kitchen utensil as recited in claim 40, wherein said handle includes a support member proximate said first end of said handle, said support member being configured to elevate said operational end and to facilitate support of said operational end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, said first protrusion extending downward from said handle a greater distance than any other of said plurality of protrusions, wherein at least said first and second protrusions are configured to jointly remove a conventional bottle cap.

48. The extendable kitchen utensil as recited in claim 40, wherein said operational end includes a longitudinal scraping edge with a plurality of edge segments, each of said plurality of edge segments has a defined length, at least two of said edge segments of said longitudinal scraping edge other than a longest edge segment have a length between 50% and 99% of the length of the longest edge segment, and said longitudinal scraping edge is operable to simultaneously mateably engage with at least two of a plurality of internal wall sections and an internal bottom corner of a conventional food jar.

49. The extendable kitchen utensil as recited in claim 48, wherein said operational end is further configured to simultaneously mateably engage a bottom internal surface of said conventional food jar along with said at least two of said plurality of internal wall sections and said internal bottom corner of said conventional food jar.

50. The extendable kitchen utensil as recited in claim 48, wherein said operational end includes a longitudinal cutting edge on a side opposite said longitudinal scraping edge, and said longitudinal cutting edge includes a portion that is serrated so as to be operable to cut a food object.

51. A kitchen utensil comprising:
a handle having a first end and a second end;
an operational end positioned more proximate said first end than said second end of said handle, said operational end being configured for food related tasks; and
a support member, said support member being connected with said handle, said support member being configured to elevate said operational end and to facilitate support of said operational end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, wherein said first protrusion extends downward from said handle a greater distance than any other of said plurality of protrusions, wherein said second protrusion includes a primary portion extending downward from said handle, and a secondary portion that extends toward said first protrusion from said primary portion, wherein the protrusions are spaced along the length of the handle, wherein at least said first and second protrusions are configured to jointly remove a conventional bottle cap.

52. The kitchen utensil as recited in claim 51, wherein said handle is configured to remove caps from conventional bottles by prying off or twisting off an individual cap based on the configuration of said bottle and said individual cap.

53. The kitchen utensil as recited in claim 51, wherein said kitchen utensil further includes a weight member, said weight member being connected to said handle, said weight member being positioned to inhibit only an end of said handle opposite said operational end from lifting away from a resting surface on which said kitchen utensil has been superposed.

54. The kitchen utensil as recited in claim 51, wherein said kitchen utensil further comprises an operational member, said operational member including said operational end and a shank, said shank including a first end and a second end, said operational end being connected to said shank proximate said second end of said shank, said shank being configured to be slidably coupled with said handle wherein said operational end is operable to be manipulated to and used in various lengths relative to said handle.

55. The kitchen utensil as recited in claim 54, wherein said handle includes a plurality of outside surfaces, said handle including a channel formed longitudinally therein, said channel including a slot formed longitudinally therewith, said slot extending from said channel through at least one of said plurality of outside surfaces of said handle, said shank being configured to be slidably coupled with said channel of said handle, said channel being configured to receive a substantial portion of said shank therein.

56. The kitchen utensil as recited in claim 55, wherein said handle includes at least two first connectors, said first connectors each comprising a projection formed on a surface of said channel or a cavity formed in said surface, said shank including at least one second connector, at least one of said first connectors being configured to securely engage with at least one of said at least one second connector so as to provide defined incremental and lockable positioning of said shank within said handle.

57. The kitchen utensil as recited in claim 54, wherein said operational end is configured to be releasably connected to said shank.

58. The kitchen utensil as recited in claim 55, wherein said kitchen utensil further comprises a positioning member, said positioning member being connected to said shank, said positioning member moving with said shank, said positioning member being configured such that a portion of said positioning member is operable to be slidably moveable within said slot, said positioning member being operable to facilitate positioning of said shank relative to said handle;
wherein either said positioning member is connected directly to said shank with mateable threads, or said positioning member is formed with said shank and said shank has an upward bias within said handle.

59. The kitchen utensil as recited in claim 55, wherein said handle includes at least one stop member proximate said first end of said handle and extending outward therefrom, said slot extending through said first end of said handle, said at least one stop member being operable to prevent said shank from travelling outside of said handle.

60. The kitchen utensil as recited in claim 51, wherein said operational end includes a longitudinal scraping edge with a plurality of edge segments, each of said plurality of edge segments has a defined length, at least two of said edge segments of said longitudinal scraping edge other than a longest edge segment have a length between 50% and 99% of the length of the longest edge segment, and said longitudinal scraping edge is operable to simultaneously mateably engage with at least two of a plurality of internal wall sections and an internal bottom corner of a conventional food jar.

61. The kitchen utensil as recited in claim 60, wherein said operational end is further configured to simultaneously mateably engage a bottom internal surface of said conventional food jar along with said at least two of said plurality of internal wall sections and said internal bottom corner of said conventional food jar.

62. The kitchen utensil as recited in claim 60, wherein said operational end includes a longitudinal cutting edge on a side opposite said longitudinal scraping edge, and said longitudinal cutting edge includes a portion that is serrated so as to be operable to cut a food object.

63. A kitchen utensil comprising:
a knife operational member, said knife operational member including:
a shank having a first end and a second end;
an operational knife end, said operational knife end being connected to said shank proximate said second end of said shank, said operational knife end including a longitudinal scraping edge, said longitudinal scraping edge including a plurality of edge segments;
a point element, said point element including a tip; said point element positioned on or near a lateral side of said knife operational member; and
a notch, said notch adjacent said point element and said shank, said notch comprising two sides that are at an angle to each other of less than 60 degrees, at least one of said sides of said notch being configured for cutting;
wherein at least one of said plurality of edge segments of said longitudinal scraping edge is configured to mateably engage with a linear internal wall section of a conventional food jar adjacent to an internal bottom corner of said conventional food jar; and
wherein said notch is of sufficient width and depth to rest on a top rim of said conventional food jar and to enable said tip of said point element to pierce through material disposed across an opening of said conventional food jar and to enable the cutting of said material as said notch is moved against said material, wherein said notch is not part of a serrated edge segment.

64. The kitchen utensil as recited in claim 63, wherein said operational knife end includes an end edge, and said operational knife end is configured such that said longitudinal scraping edge is operable to simultaneously mateably engage with a portion of a plurality of internal wall sections while said end edge mateably engages said bottom internal corner of said conventional food jar.

65. The kitchen utensil as recited in claim 64, wherein said end edge is configured to simultaneously mateably engage said internal bottom corner and a bottom internal surface of said conventional food jar while said longitudinal scraping edge mateably engages with a portion of a plurality of internal wall sections of said jar.

66. The kitchen utensil as recited in claim 63, wherein said operational knife end includes a longitudinal cutting edge with a portion that is serrated so as to be operable to cut a food object.

67. The kitchen utensil as recited in claim 66, wherein said longitudinal cutting edge includes a portion that is arcuate in shape.

68. The kitchen utensil as recited in claim 63, wherein each of said plurality of edge segments of said longitudinal scraping edge has a defined length, at least two of said edge segments of said longitudinal scraping edge other than a longest edge segment have a length between 50% and 99% of the length of the longest edge segment, and said longitudinal scraping edge is operable to simultaneously mateably engage with a portion of a plurality of internal wall sections of said conventional food jar that are not parallel with each other.

69. The kitchen utensil as recited in claim 68, wherein said operational knife end has a maximum width as measured perpendicular to a longitudinal centerline of said operational knife end, said shank has a maximum width as measured perpendicular to a longitudinal centerline of said shank, said maximum width of said operational knife end is at least 2.5 times greater than said maximum width of said shank, said shank has a maximum length, said operational knife end has a maximum length, and said maximum length of said shank is at least 1.5 times greater than said maximum length of said operational knife end.

70. The kitchen utensil as recited in claim 69, wherein said plurality of edge segments of said longitudinal scaping edge includes at least three edge segments that are substantially straight in manner.

71. The kitchen utensil as recited in claim 68, wherein said operational knife end includes an end edge, said end edge has a maximum length as measured perpendicular to a longitudinal centerline of said operational knife end, said operational knife end has a maximum width at approximately a longitudinal midpoint of said operational knife end as measured perpendicular to said longitudinal centerline of said operational knife end, said maximum length of said end edge is less than 50% of said maximum midpoint width of said operational knife end, said end edge includes at least one substantially straight edge segment, and said end edge is configured to simultaneously mateably engage said internal bottom corner of said jar while said longitudinal scraping edge mateably engages said wall section adjacent said bottom corner of said jar.

72. The kitchen utensil as recited in claim 63, further comprising a handle having a first end and a second end, said shank being configured to be slidably coupled with said handle wherein said operational knife end is operable to be manipulated to and used in various lengths relative to said handle.

73. The kitchen utensil as recited in claim 72, wherein said handle includes a plurality of outside surfaces, said handle including a channel formed longitudinally therein, said channel including a slot formed longitudinally therewith, said slot extending from said channel through at least one of said plurality of outside surfaces of said handle, said shank being configured to be slidably coupled with said channel of said handle, said channel being configured to receive a substantial portion of said shank therein.

74. The kitchen utensil as recited in claim 73, wherein said handle further includes at least two first connectors, said first connectors each comprising a projection formed on a surface of said channel or a cavity formed in said surface, said shank including at least one second connector, at least one of said first connectors being configured to securely engage with at least one of said at least one second connector so as to provide defined incremental and lockable positioning of said shank within said handle.

75. The kitchen utensil as recited in claim 73, wherein said kitchen utensil further includes a positioning member, said positioning member being connected to said shank, said positioning member moving with said shank, said positioning member being configured such that a portion of said positioning member is operable to be slidably moveable within said slot, said positioning member being operable to facilitate positioning of said shank relative to said handle;
wherein either said positioning member is connected directly to said shank with mateable threads, or said positioning member is formed with said shank and said shank has an upward bias within said handle.

76. The kitchen utensil as recited in claim 73, wherein said handle includes at least one stop member proximate said first end of said handle and extending outward therefrom, said slot extending through said first end of said handle, said at least one stop member being operable to prevent said shank from travelling outside of said handle.

77. The kitchen utensil as recited in claim 72, wherein said handle includes a support member proximate said first end of said handle, said support member being configured to elevate said operational knife end and to facilitate support of said operational knife end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, said first protrusion extending downward from said handle a greater distance than any other of said plurality of protrusions, wherein at least said first and second protrusions are configured to jointly remove a conventional bottle cap.

78. The kitchen utensil as recited in claim 63, wherein said operational knife end is configured to be releasably connected to said shank.

79. A kitchen utensil comprising:
a knife operational member, said knife operational member including an operational knife end and a shank, said shank having a first and second end, said operational knife end being connected to said shank proximate said second end of said shank, said operational knife end including:
an end edge, said end edge including at least one edge segment, said end edge being configured to mateably engage a substantial portion of an internal bottom corner of a conventional food jar; and
a longitudinal scraping edge, said longitudinal scraping edge including at least three edge segments;
wherein a bottom edge segment of said at least three edge segments of said longitudinal scraping edge is configured to mateably engage with an internal wall section of a plurality of internal wall sections of said conventional food jar adjacent to the internal bottom corner of said conventional food jar simultaneously with said end edge mateably engaging said internal bottom corner of said conventional food jar;
wherein said end edge includes a corner edge segment proximate the bottom edge segment of said longitudinal scraping edge, and the angle between said bottom edge segment of said longitudinal scraping edge said corner edge segment of said end edge is substantially more than 90 degrees such that all of said corner edge segment of said end edge is positioned at least as low as the lowest point of said longitudinal scraping edge when said kitchen utensil is in a vertical position and is operable to mateably engage said internal bottom corner of said conventional food jar; and
wherein said operational knife end is configured to facilitate efficient removal of food material from said conventional food jar.

80. The kitchen utensil as recited in claim 79, wherein said kitchen utensil includes a longitudinal cutting edge with a portion that is serrated so as to be operable to cut a food object.

81. The kitchen utensil as recited in claim 80, wherein said longitudinal cutting edge includes a portion that is arcuate in shape.

82. The kitchen utensil as recited in claim 79, wherein said operational knife end is configured to simultaneously mateably engage with at least two of said plurality of internal wall sections and said internal bottom corner of said conventional food jar.

83. The kitchen utensil as recited in claim 82, wherein said operational knife end is further configured to simultaneously mateably engage a bottom internal surface of said conventional food jar along with said at least two of said plurality of internal wall sections and said internal bottom corner of said conventional food jar.

84. The kitchen utensil as recited in claim 79, wherein each of said at least three edge segments of said longitudinal scraping edge has a defined length, at least two of said edge segments of said longitudinal scraping edge other than a longest edge segment have a length between 50% and 99% of the length of the longest edge segment, and said longitudinal scraping edge is operable to simultaneously mateably engage with a portion of said plurality of internal wall sections of said conventional food jar that are not parallel with each other.

85. The kitchen utensil as recited in claim 84, wherein said operational knife end has a maximum width as measured perpendicular to a longitudinal centerline of said operational knife end, said shank has a maximum width as measured perpendicular to a longitudinal centerline of said shank, said maximum width of said operational knife end is at least 2.5 times greater than said maximum width of said shank, said shank has a maximum length, said operational knife end has a maximum length, and said maximum length of said shank is at least 1.5 times greater than said maximum length of said operational knife end.

86. The kitchen utensil as recited in claim 85, wherein said longitudinal scaping edge includes at least three edge segments that are substantially straight in manner.

87. The kitchen utensil as recited in claim 84, wherein said end edge has a maximum length as measured perpendicular to a longitudinal centerline of said operational knife end, said operational knife end has a maximum width at approximately a longitudinal midpoint of said operational knife end as measured perpendicular to a longitudinal centerline of said operational knife end, said maximum length of said end edge is less than 50% of said maximum midpoint width of said operational knife end, and said end edge includes at least one substantially straight edge segment.

88. The kitchen utensil as recited in claim 79, further comprising a handle having a first end and a second end, said shank being configured to be slidably coupled with said handle wherein said operational knife end is operable to be manipulated to and used in various lengths relative to said handle.

89. The kitchen utensil as recited in claim 88, wherein said handle includes a plurality of outside surfaces, said handle including a channel formed longitudinally therein, said channel including a slot formed longitudinally therewith, said slot extending from said channel through at least one of said plurality of outside surfaces of said handle, said shank being configured to be slidably coupled with said channel of said handle, said channel being configured to receive a substantial portion of said shank therein.

90. The kitchen utensil as recited in claim 89, wherein said handle further includes at least two first connectors, said first connectors each comprising a projection formed on a surface of said channel or a cavity formed in said surface, said shank including at least one second connector, at least one of said first connectors being configured to securely engage with at least one of said at least one second connector so as to provide defined incremental and lockable positioning of said shank within said handle.

91. The kitchen utensil as recited in claim 89, wherein said kitchen utensil further comprises a positioning member, said positioning member being connected to said shank, said positioning member moving with said shank, said positioning member being configured such that a portion of said positioning member is operable to be slidably moveable within said slot, said positioning member being operable to facilitate positioning of said shank relative to said handle;
wherein either said positioning member is connected directly to said shank with mateable threads, or said positioning member is formed with said shank and said shank has an upward bias within said handle.

92. The kitchen utensil as recited in claim 89, wherein said handle includes at least one stop member proximate said first end of said handle and extending outward therefrom, said slot extending through said first end of said handle, said at least one stop member being operable to prevent said shank from travelling outside of said handle.

93. The kitchen utensil as recited in claim 88, wherein said knife operational member further includes:
a point element, said point element including a tip; said point element positioned on or near a lateral side of said knife operational member; and
a notch, said notch adjacent said point element and said shank, said notch comprising two sides that are at an angle to each other of less than 60 degrees, at least one of said sides of said notch being configured for cutting;
wherein said notch is of sufficient width and depth to rest on a top rim of said conventional food jar and to enable said tip of said point element to pierce through material disposed across an opening of said conventional food jar and to enable the cutting of said material as said notch is moved against said material, wherein said notch is not part of a serrated edge segment.

94. The kitchen utensil as recited in claim 88, wherein said handle includes a support member proximate said first end of said handle, said support member being configured to elevate said operational knife end and to facilitate support of said operational knife end above a resting surface that said kitchen utensil has been superposed, said support member comprising a plurality of protrusions extending downward from said handle, said plurality of protrusions comprising a first protrusion positioned most proximate to said first end of said handle relative to any other of said plurality of protrusions and a second protrusion positioned proximate said first protrusion, said first protrusion extending downward from said handle a greater distance than any other of said plurality of protrusions, wherein at least said first and second protrusions are configured to jointly remove a conventional bottle cap.

95. The kitchen utensil as recited in claim 79, wherein said operational knife end is configured to be releasably connected to said shank.

\* \* \* \* \*